United States Patent

[11] 3,564,278

| [72] | Inventor | Lionel Robbins<br>Orchard Lake, Mich. |
|---|---|---|
| [21] | Appl. No. | 787,509 |
| [22] | Filed | Dec. 27, 1968 |
| [45] | Patented | Feb. 16, 1971 |
| [73] | Assignee | Energy Conversion Devices, Inc.<br>Troy, Mich. |

[54] SQUIB CONTROL CIRCUIT
2 Claims, 4 Drawing Figs.

[52] U.S. Cl. .................................................. 307/108
[51] Int. Cl. ................................................... H03k 3/00
[50] Field of Search ....................................... 307/38, 39,
40, 41, 112, 115, 106, 108, 258, 324; 102/70.2;
315/209; 320/1

[56] References Cited
UNITED STATES PATENTS

| 3,001,477 | 9/1961 | Ruehlemann | 102/70.2 |
| 3,071,698 | 1/1963 | Thompson et al. | 307/258 |
| 3,088,409 | 5/1963 | Yauelberg | 102/70.2 |
| 3,099,962 | 8/1963 | Smith | 307/41X |
| 3,124,701 | 3/1964 | Given et al. | 307/258X |
| 3,397,329 | 8/1968 | Riedel | 102/70.2X |
| 3,417,259 | 12/1968 | Nozawa et al. | 307/100 |

Primary Examiner—Robert K. Schaefer
Assistant Examiner—H. J. Hohauser
Attorney—Wallenstein, Spangenberg, Hattis and Strampel ABSTRACT: A squib control circuit for feeding a high power current pulse to a load comprising: a low peak power source of a DC voltage having a pair of output terminals across which said DC voltage appears, a capacitor, a resistor, means connecting said capacitor and resistor in series between said output terminals of said source of DC voltage so the capacitor charges to said DC voltage through the resistor, a squib element through which a current pulse is to be fed, self-resetting threshold switch means connected in series with said squib element across said capacitor, said threshold switch means normally presenting a high resistance current blocking condition and wherein said high resistance in response to a voltage applied across said threshold switch means above a given threshold voltage value substantially instantaneously decreases to a low resistance conducting condition, which low resistance conducting condition persists until the current flowing therethrough drops below a given holding current level, and a relatively low power voltage pulse source for triggering said threshold switch device from said high resistance blocking condition to said low resistance conducting condition, said capacitor then discharging to feed a high power current pulse through the squib element.

PATENTED FEB 16 1971 3,564,278

Inventor
Lionel Robbins
By: Wallenstein, Spangenberg, Hattis & Strampel attys

3,564,278

SQUIB CONTROL CIRCUIT

This invention relates to the control of squib elements used, for example, to control the firing of rockets or other detonable devices. However, some aspects of the invention may have application to load devices other than squib elements where high peak power current pulses are required.

One of the objects of the invention is to provide a squib control circuit for firing a squib element by a short, relatively high power current pulse fed thereto using relatively low peak power voltage sources and which control circuit has substantially greater reliability than the circuits heretofore used for firing such squib elements.

A related object of the invention is to provide a squib control circuit as described which has in series with each squib element a current controlling device, referred to as a threshold switch device, which can be rendered conductive when a voltage is applied thereacross which exceeds a given threshold level and which can be readily pretested in the field to determine its operability under the squib firing conditions which actually exist.

The squib control circuit of the invention comprises a low peak power source of a DC voltage having a pair of output terminals across which the DC voltage appears. A capacitor and a resistor are connected in series between said output terminals of said source of DC voltage so the capacitor charges to said DC voltage through the resistor. A squib element, through which a current pulse is to be fed, and a self-resetting solid state threshold switch means are connected in series across the capacitor, the threshold switch means normally presenting a high resistance current blocking condition for substantially clocking current through said squib element and wherein said high resistance in response to a voltage applied across said threshold switch means above a given threshold voltage value greater than said DC voltage substantially instantaneously decreases to a low resistance conducting condition, which low resistance conducting condition persists until the current flowing therethrough drops below a given holding current level. A relatively low power voltage pulse source is provided for triggering the threshold switch device from said high resistance blocking condition to said low resistance conducting condition, the capacitor then discharging to feed a high power current pulse through the squib element.

The threshold switch means referred to may be a single threshold switch device wherein the low power voltage pulse source is connected across said capacitor to increase the charge thereof to a value above the threshold voltage value of the threshold switch device. Most advantageously, the threshold switch means comprise a pair of threshold switch devices connected in series, said voltage pulse source being coupled across only one of said threshold switch devices and generating a pulse having an amplitude which exceeds the threshold voltage value of the latter threshold switch device. The DC voltage to which the capacitor is charged by the source of DC voltage exceeds the threshold voltage value of the other threshold switch device so it will be triggered into a low resistance conducting condition as soon as the latter threshold switch device is so triggered by the voltage pulse source. A test circuit is most advantageously provided for testing the operation of the one or two threshold switch devices, the test circuit including a test fuse element which will blow if substituted for said squib element and a manually operable switch means for selectively connecting said squib element or said test fuse element into the circuit.

The above and other objects and features of this invention will become apparent upon making reference to the specification to follow, the claims and the drawings wherein:

Figure 1:
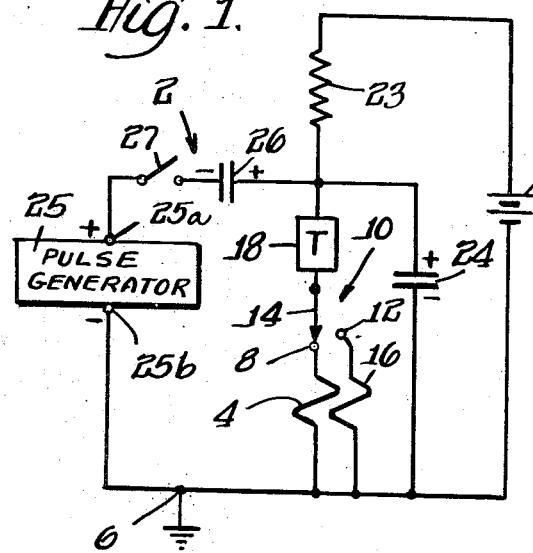
FIG. 1 is a circuit diagram of a squib control circuit of the invention having a low input impedance.

The circuit of FIG. 1 identified by reference number 2 includes a squib element 4 which is a relatively expensive fuse element which, when current of a given value flows therethrough, heats up and blows to open the circuit involved. The blowing of the fuse may initiate the detonation of a rocket or other detonatable device. The squib element 4 is connected between a common ground line 6 and a stationary contact 8 of a manually operable, single pole, double-throw switch 10 having another stationary contact 12 and a movable pole or wiper 14. A relatively inexpensive test fuse element 16 is connected between the stationary contact 12 and the grounded line 6. The movable pole or wiper 14 is connected to one of the terminals of a threshold switch device 18 which most desirably is the device disclosed and claimed in U.S. Pat. No. 3,271,591, granted on Sept. 6, 1966 to S. R. Ovshinsky and referred to as a "Mechanism" device. The threshold switch device 18 is a two-terminal device which switches from a normally high resistance to a low resistance or conducting condition when the applied voltage exceeds some threshold voltage value, and reverts to the high resistance condition when the current flow therethrough falls below some minimum holding current value. This device is most advantageously comprised of a film or layer of semiconductor material applied by vacuum deposition, sputtering or screening on any conductive electrode-forming layer carried on a suitable base of insulating material. The threshold switch device 18 and other associated circuit elements, except necessarily discrete devices like the squib element 4 and voltage sources to be described, may be deposited by screening or otherwise on a common base of insulation material.

While for purposes of illustration, reference is made to the "Mechanism" switch device disclosed in U.S. Pat. No. 3,271,591, other switch devices having characteristics similar to those of the devices of the patent may be utilized in this invention. Thus, although of little practical value, a neon lamp and a four or five-layer diode is, in accordance with the broadest aspects of the invention, useful as switch devices in the squib control circuit being described. However, these devices are discrete devices or they require special substrates, as in the case of integrated circuit type semiconductor diodes, so that they cannot be fabricated by film deposition on almost any base like the film-type semiconductor threshold switch devices disclosed in said U.S. Pat. No. 3,271,591. Furthermore, unlike neon lamps and said four and five-layer diodes, these film threshold switch devices can be fabricated with a wide selection of threshold levels of modest values (e.g., 5—30 volts) merely by controlling the thickness of the films.

Figure 2:
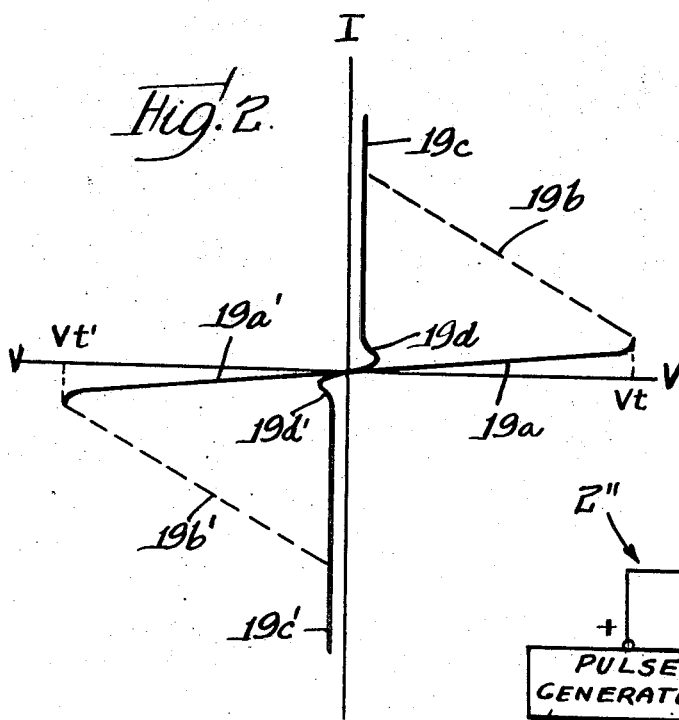
FIG. 2 shows the current-voltage characteristic of the threshold switch devices in FIG. 1.

FIG. 2 is an I—V curve illustrating the operation of the threshold switch device 18. The device 18 is normally in a high resistance condition and, as the DC voltage applied to the terminals thereof is increased from zero, the voltage-current characteristics of the device is illustrated by the curve portions 19a and 19a' for voltages of opposite polarity, the electrical resistance of the device then being high and substantially blocking the current flow therethrough. When the voltage is increased to the threshold voltage value $V_t$ or $V_t'$ thereof, the high electrical resistance of the device substantially instantaneously decreases in at least one path in the semiconductor material between the terminals thereof, the substantially instantaneous switching being indicated by the curve portions 19b and 19b' thereof. This provides a low electrical resistance or conducting condition for conducting current therethrough. The low electrical resistance is many orders of magnitude less than the high electrical resistance. The conducting condition is illustrated by the curve portion 19c and 19c' In the low resistance current conducting condition the device has a voltage drop which is a minor fraction of the voltage drop in the high resistance blocking condition near the threshold value $V_t$ or $V_t'$.

As the voltage is decreased, the current decreases along the curve portion 19c or 19c' and, when the current decreases below a minimum current holding value, the low electrical resistance of said at least one path immediately returns to the high electrical resistance as illustrated by the curve portion 19d and 19d' to reestablish the high resistance blocking condition. In other words a current is required to maintain the threshold switch device in its conducting condition and, when the current falls below a minimum current holding value, the low electrical resistance immediately returns to the high electrical resistance. It should be observed that each of the threshold switch devices is symmetrical in its operation, it blocking current substantially equally in each direction for a given voltage and it conducting current substantially equally in each direction for a given voltage, and the switching between the blocking and conducting conditions being extremely rapid.

A typical value for the high electrical resistance of a threshold switch device disclosed in the aforesaid patent is 1 or more megohms; a typical value for the low electrical resistance thereof is 10 ohms or less; a typical range of threshold voltage value thereof is 20—30 volts; the voltage drop thereacross in the conducting condition thereof is usually 1.5 volts or less; and the response time thereof (i.e. the period starting with the application of a switching voltage and ending with the instant the device completes a switching operation to its low resistance conducting condition) is typically several hundred nanoseconds.

It will be assumed that the squib or fuse element 4 or 16 has an insignificant resistance (e.g. 1—10 ohms) relative to the high resistance of the threshold switch device 18 and that the squib element 4 or the fuse element 16 blows when a current exceeding a given value flows therethrough for a certain minimum period which occurs in the manner to be explained when the threshold switch device 18 is triggered to a low resistance conducting condition. The manually operable switch 10 selectively connects the fuse or squib element to the associated threshold switch device. The fuse element 16 is initially connected into the circuit to test the operation of the circuit under actual field operating conditions. If the fuse element blows, then the switch 10 is operated to connect the squib element into the circuit to arm the same.

Means are provided for selectively providing a squib or fuse-blowing initiating voltage pulse across the series circuit of the squib or fuse element 4 or 16 and the threshold switch device 18. This means most advantageously includes a source of steady DC voltage 22 and an isolating resistor 23 connected in series across the threshold switch device 18 and the squib or fuse element 4 or 16, and a capacitor 24 also connected across the same. The output of the source of DC voltage is less than the threshold voltage value of the threshold switch device 18, capacitor 24 charges to this voltage through resistor 23. A pulse generator circuit 25 is also provided whose output pulses when preferably added in the manner to be explained to the voltage output of the source of DC voltage, produces a resultant voltage which exceeds the threshold voltage value of the threshold switch device 18. A manually operable switch 27 is shown interposed between a terminal 25a of the pulse generator circuit 25 and a capacitor 26 connected in series with the end of the isolating resistor 23 remote from the source of DC voltage 22. The opposite terminal 25b of the pulse generator circuit 25 is connected to the ground line 6. The pulse generator circuit 25, in the absence of a pulse output and upon closure of switch 27, acts as a low resistance path for the charging of capacitor 26 through resistor 23 to the voltage of the output of the source of DC voltage 22. Each pulse generated by the pulse generator circuit 25 adds to the voltage across the capacitor 26 as indicated to provide a resultant voltage which exceeds the threshold voltage value of the threshold switch device 18. The capacitor 24 charges up to this resultant voltage. Capacitor 24 must be sufficiently large to store enough charge energy to blow the squib and fuse elements 4 and 16 when the switch device 18 is rendered conductive. When a fuse or squib element blows, current stops flowing in the circuit involved and the threshold switch device 18 resets to a normal high resistance condition.

For purposes of explaining the operation of the circuit shown in FIG. 1, it will be assumed that the threshold voltage value of the threshold switch device 18 is 28 volts, the pulse generator circuit 25 produces plus 20 volt pulses and the source of DC voltage 22 has an output of plus 10 volts. Then, upon closure of switch 27 and before the pulse generator circuit 24 produces a pulse, capacitors 24 and 26 will charge to 10 volts through resistor 23. When the pulse generator circuit 24 generates a 20 volt pulse, this pulse adds to the voltage across the capacitor 26 to produce 30 volts across the capacitor 24 which charges to 30 volts. Since it has been assumed that the normal high resistance of the threshold switch device 18 is many orders greater than the resistance of the squib and fuse element 4 and 16, slightly under 30 volts appears across the threshold switch device to trigger the same into a conducting condition. The capacitor 24 with a substantial charge thereon then discharges through the squib or fuse element 4 or 16 to blow the same.

Figure 3:
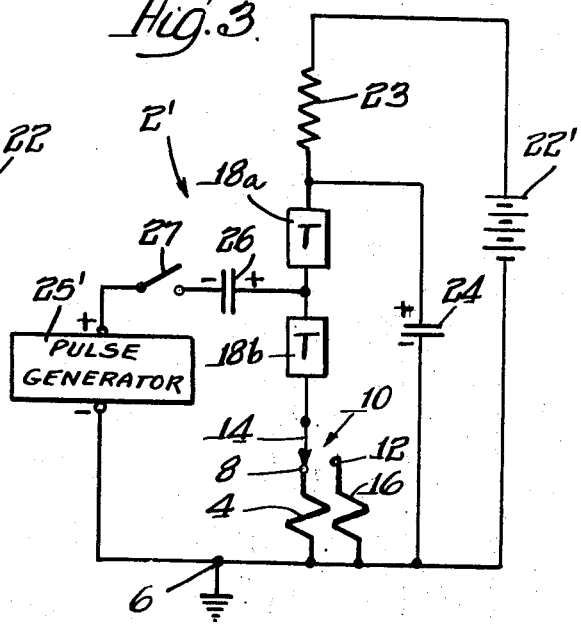
FIG. 3 is a circuit diagram of a squib control circuit of the invention having a high input impedance.

In the circuit of FIG. 1 the pulse generator circuit 25 must have sufficient power capability to charge the large capacitor 24. Refer now to FIG. 3 which is a circuit 2' having a high input impedance and a pulse generator circuit 25' which does not need the power to charge up the large capacitor 24, as in the case of FIG. 1. (The circuits of FIGS. 1 and 3 are similar in some respects and corresponding elements therein have been similarly numbered). In the circuit 2' of FIG. 3, two threshold switch devices 18a and 18b are utilized which may be identical to the threshold switch device 18 previously described in connection with FIG. 1. The pulse generator circuit 25', the manually operable switch 27 and the capacitor 26 are connected in series between the juncture of threshold switch device 18a and 18b, the threshold switch device 18b being connected in series with the movable pole 14 of the switch 10 and the stationary contact 8 or 12 thereof to which the selected squib element 4 or fuse element 16 is connected. The threshold switch device 18a isolates the pulse generator circuit from the capacitor 24 connected between one end of the resistor 23 leading to a source of DC voltage 22' and the ground line 6. The pulse generator circuit 25' does not, therefore, charge the large capacitor 24, as in the case of the circuit of FIG. 1. Each output pulse from the pulse generator circuit 25', however, has an amplitude (e.g. 30 volts) which exceeds the threshold voltage value of the threshold switch device 18b, namely 28 volts in the example described above.

Unlike the circuit in FIG. 1, the output of the source of DC voltage 22' exceeds the threshold voltage value of the threshold switch device 18a, which is also 28 volts in the example of the invention being described, so that the capacitor 24 charges through resistor 23 to a voltage which can trigger the threshold switch device 18a into its conducting condition immediately after the threshold switch device 18b has been triggered to its conducting condition by a pulse from the pulse generator circuit 25'. Thus, in the example of the invention being described, the output of the source of DC voltage 22' would be about 30 volts or more. (In some of the claims intended generally to cover the forms of the invention shown in FIGS. 1 and 3, the one or more threshold switch devices used in the circuit are referred to as threshold switch means and the threshold voltage value of the same referred to therein represents the sum of the individual threshold voltage values thereof so that referred to all of the devices collectively the output of the source of DC voltage 22' would be less than the sum of the threshold voltage values involved.) The sum of the resistance of the squib or fuse element 4 or 16 and the low resistance of the conducting threshold switch device 18b is insignificant relative to the high resistance of the nonconducting threshold switch device 18a, so most of the voltage across the capacitor 24 will be applied across the threshold switch device 18a after the threshold switch device 18b has been rendered conductive. When this occurs, the capacitor 24 discharges through the threshold switch device devices 18a and 18b and the squib or fuse element 4 or 16 connected by switch 10 with the circuit to blow the same.

Figure 4:
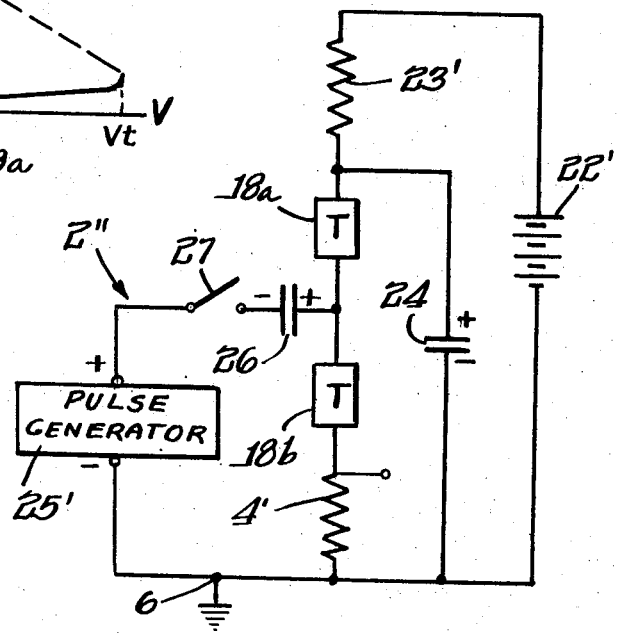
FIG. 4 is a circuit diagram of a circuit similar to that shown in FIG. 3 but having a different load which, unlike a squib or fuse element, does not blow to open the circuit.

As previously indicated, some of the aspects of the invention have application to loads other than squib or fuse elements. Such a circuit 2" is shown in FIG. 4 which is substantially identical to the circuit 2' shown in FIG. 3 except that the squib and fuse elements 4 and 16 and the associated manually operable switch 10 have been replaced by a load resistor 4' through which it is desired to flow a succession of high energy current pulses. Also, the resistor 23' connecting the threshold switch device 18a and capacitor 24 to the source of DC voltage 22' must be selected so that, once the capacitor 24 discharges through the threshold switch device 18a, 18b and the load resistor 4', current flow through the resistor 23' from the source of DC voltage 22' will be less than the holding current level of the threshold switch devices 18a and 18b, so the latter will then become nonconductive. After capacitor 24 discharges, it recharges to the output of the source of DC voltage 22'. In the circuits 2 and 2' of FIGS. 1 and 3, once the squib or fuse element has been blown, the circuit becomes permanently nonconductive. However, in the circuit of FIG. 4, each pulse output of the pulse generator circuit 25' initiates a new current pulse through the resistor 4'.

It should be understood that numerous modifications may be made in the most preferred forms of the invention described above without deviating from the broader aspects of the present invention.

I claim:

1. A circuit for feeding a relative relatively high power current pulse to a load comprising: a low peak power source of a DC voltage having a pair of output terminals across which the DC voltage appears, a capacitor, a resistor, means connecting said capacitor and resistor in series between said output terminals of said source of DC voltage, so the capacitor charges to said DC voltage through the resistor, load means through which a current pulse is to be fed, self-resetting threshold switch means connected in series with said load means across said capacitor, said threshold switch means normally presenting a high resistance current blocking condition for substantially blocking current through said load means and wherein said high resistance in response to a voltage applied across said threshold switch means above a given threshold voltage value greater than said DC voltage substantially instantaneously decreases to a low resistance conducting condition which low resistance conducting condition persists until the current flowing therethrough drops below a given holding current level, and a relatively low power voltage pulse source for triggering said threshold switch device from said high resistance blocking condition to said low resistance conducting condition, said capacitor then discharging to feed a high power current pulse through said load means, said load means being one which remains intact when said capacitor discharges therethrough and said resistor being of a value to reduce the current flow through said threshold switch means to a value below said holding current level after said capacitor has discharged.

2. A circuit for feeding a relatively high power current pulse to a load comprising: a low peak power source of DC voltage having a pair of output terminals across which the DC voltage appears, a capacitor, a resistor, means connecting said capacitor and resistor in series between said output terminals of said source of DC voltage, so the capacitor charges to said DC voltage through the resistor, a squib element through which a current pulse is to be fed to heat and blow the said self-resetting threshold switch means connected in series with said load means across said capacitor, said threshold switch means normally presenting a high resistance current blocking condition for substantially blocking current through said load means and wherein said high resistance in response to a voltage applied across said threshold switch means above a given threshold voltage value greater than said DC voltage substantially instantaneously decreases to a low resistance conducting condition persists which low resistance conducting condition persists until the current flowing therethrough drops below a given holding current level, a relatively low power voltage pulse source for triggering said threshold switch device from said high resistance blocking condition to said low resistance conducting condition, said capacitor then discharging to feed a high power current pulse through said load means, and a test circuit for testing the operation of said threshold switch means, said test circuit comprising a test fuse which will blow if substituted for said squib element, and manually operable switch means for selectively connecting said squib or fuse element in series with said threshold switch means.